(12) United States Patent
Kato et al.

(10) Patent No.: US 10,976,985 B2
(45) Date of Patent: Apr. 13, 2021

(54) RECORDING MEDIUM RECORDING DATA DISPLAY PROGRAM, DATA DISPLAY METHOD, AND ELECTRONIC APPARATUS FOR DISPLAYING RECEIVED DATA BY DELAYING AN ADJUSTMENT TIME

(71) Applicant: FUJITSU LIMITED, Kawasaki (JP)

(72) Inventors: Yoshiyuki Kato, Kawasaki (JP);
Yukihiko Furumoto, Kawasaki (JP);
Kazunori Kumagai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/853,800

(22) Filed: Apr. 21, 2020

(65) Prior Publication Data

US 2020/0341715 A1     Oct. 29, 2020

(30) Foreign Application Priority Data

Apr. 26, 2019   (JP) .............................. JP2019-085972

(51) Int. Cl.
| | |
|---|---|
| G06F 3/14 | (2006.01) |
| G06T 13/20 | (2011.01) |
| H04L 29/06 | (2006.01) |

(52) U.S. Cl.
CPC ............ *G06F 3/1454* (2013.01); *G06T 13/20* (2013.01); *H04L 67/38* (2013.01); *G06T 2200/04* (2013.01)

(58) Field of Classification Search
CPC ....... G06F 3/1454; G06F 3/147; G06T 13/20; G06T 2200/04; H04L 67/38; H04N 21/44; G09G 2320/0252; G09G 2360/08; G09G 2360/12; G09G 2370/022; G09G 2350/00; G09G 5/006; G09G 5/12
See application file for complete search history.

(56) References Cited

U.S. PATENT DOCUMENTS

| | | | | |
|---|---|---|---|---|
| 8,291,460 | B1 * | 10/2012 | Peacock | ................. H04N 7/188 |
| | | | | 725/93 |
| 9,521,218 | B1 * | 12/2016 | Fan | ......................... H03M 7/40 |
| 2010/0161711 | A1 * | 6/2010 | Makhija | .................. H04L 69/02 |
| | | | | 709/203 |
| 2012/0002715 | A1 | 1/2012 | Matsui et al. | |

(Continued)

FOREIGN PATENT DOCUMENTS

| | | |
|---|---|---|
| JP | 2012-014533 A | 1/2012 |
| JP | 2015-191630 A | 11/2015 |

*Primary Examiner* — Maureice L. McDowell, Jr.
(74) *Attorney, Agent, or Firm* — Fujitsu Patent Center

(57) ABSTRACT

A recording medium recording a program for causing a computer to execute a process including: acquiring a display target time by adding a fixed time to an average process time, which is an average of a sum of past times demanded for compression, network transfer, and decompression; acquiring a second time point when a decompression process of a data body is completed after reception of data which includes a first time point before a server compresses the data body; acquiring a current process time which indicates a sum of times demanded for compression, network transfer, and decompression of the data body by subtracting the first time point from the second time point; acquiring an adjustment time by subtracting the current process time from the display target time; displaying the data body by delaying the adjustment time; and updating a past average process time by including the current process time.

8 Claims, 17 Drawing Sheets

(56) References Cited

U.S. PATENT DOCUMENTS

| | | | |
|---|---|---|---|
| 2015/0229960 A1* | 8/2015 | Yamasaki | H04N 19/593 375/240.12 |
| 2015/0249824 A1* | 9/2015 | Takada | H04N 19/507 382/232 |
| 2015/0281699 A1 | 10/2015 | Miyamoto et al. | |
| 2017/0186401 A1* | 6/2017 | Sherstoboev | G09G 5/005 |

* cited by examiner

FIG. 16

```
                                                       G90
┌─────────────────────────────────────────────────────────┐
│                                                         │
│   MAXIMUM ADJUSTMENT TIME                               │
│                                                         │
│   ○  AUTOMATIC (CALCULATE FROM INTERVAL BETWEEN         │
│      FRAMES AUTOMATICALLY)                              │
│                                                         │
│         COEFFICIENT  [        ]  [TIMES]                │
│                          90a                            │
│                                                         │
│   ○  DESIGNATE MAXIMUM ADJUSTMENT TIME                  │
│                                                         │
│                      [        ]  [MILLISECOND]          │
│                          90b                            │
│                                                         │
└─────────────────────────────────────────────────────────┘
```

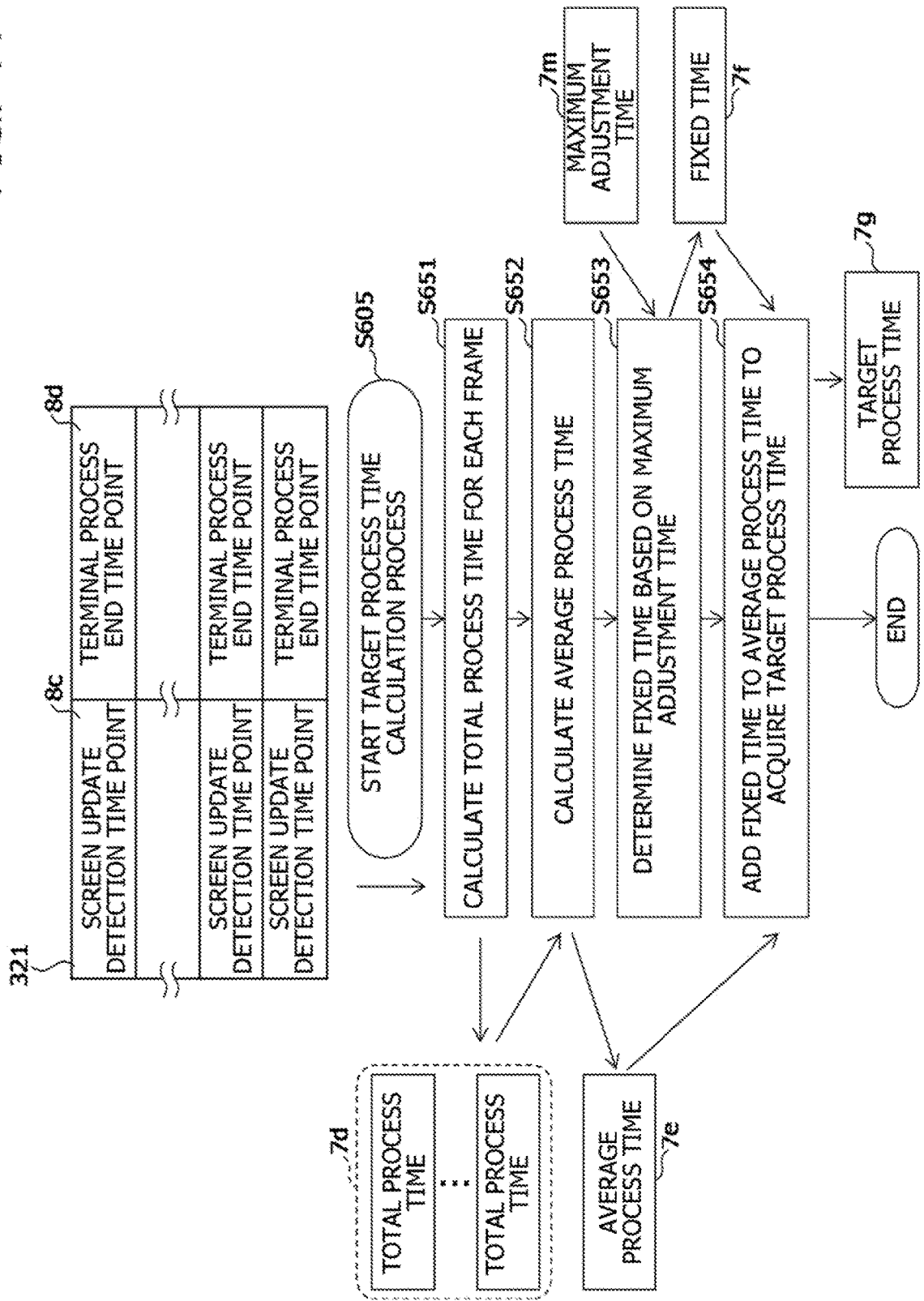

RECORDING MEDIUM RECORDING DATA DISPLAY PROGRAM, DATA DISPLAY METHOD, AND ELECTRONIC APPARATUS FOR DISPLAYING RECEIVED DATA BY DELAYING AN ADJUSTMENT TIME

CROSS-REFERENCE TO RELATED APPLICATION

This application is based upon and claims the benefit of priority of the prior Japanese Patent Application No. 2019-85972, filed on Apr. 26, 2019, the entire contents of which are incorporated herein by reference.

FIELD

The embodiment discussed herein is related to a recording medium, a received data display method, and an electronic apparatus.

BACKGROUND

A virtual desktop that virtualizes a desktop of a terminal on a server has been hitherto known. In this virtual desktop, a virtualized infrastructure of the terminal is built on the server, a remote operation is accepted from the terminal, and the server transmits images on the desktop screen to the terminal at a predetermined frame rate to display the images on the terminal.

Japanese Laid-open Patent Publication No. 2012-14533 and Japanese Laid-open Patent Publication No. 2015-191630 are examples of related art.

SUMMARY

According to an aspect of the embodiments, a non-transitory computer-readable recording medium having stored therein a program for causing a computer to execute a process for displaying received data, the process includes: acquiring a display target time by adding a fixed time to an average process time, which is an average of a sum of past times demanded for compression, network transfer, and decompression; acquiring a second time point when a decompression process of a data body is completed after reception of data which includes a first time point before a server compresses the data body; acquiring a current process time which indicates a sum of times demanded for compression, network transfer, and decompression of the data body by subtracting the first time point from the second time point; acquiring an adjustment time by subtracting the current process time from the display target time; displaying the data body by delaying the adjustment time; and updating a past average process time by including the current process time.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is a diagram illustrating an example of a setting screen for a maximum adjustment time; and FIG. 17 is a flowchart for explaining a target process time calculation process in step S605 in FIG. 14.

DESCRIPTION OF EMBODIMENTS

Under the virtual desktop infrastructure (VDI), when the server transmits all images on the desktop as still image data, image data volume to be transmitted through a network increases, so that operability of the terminal may be deteriorated. For example, in a case that a communication band of the network between the server and the terminal is narrow, when the data volume to be transmitted increases, the operability may be deteriorated due to a delay in displaying the images on the terminal.

Accordingly, as a technique for reducing the data volume to be transmitted, there has been known a technique in which the image as a frame to be transmitted is divided into a plurality of areas so that a frequency of changes between images as the frames for each area is determined, and the images as the frames are transmitted after a compression process for an animation is performed in areas where the frequency of changes exceeds a threshold. There has been also provided a technique for allowing a user to recognize the transmitted images as an animation more quickly than before and displaying images on a terminal with a slight delay by increasing the frequency of change confirmations more than an interval of transmitting the images.

In a virtual desktop infrastructure, various factors such as data volume, communication speed, process speed, and the like affect quality of images displayed on a terminal. The techniques described above are techniques corresponding to the data volume, and are not enough for other factors such as the communication speed, the process speed, and the like.

Accordingly, there is a problem that display quality of an animation as a three-dimensional computer graphics (3D-

CG) model provided by a server may not be kept uniform under a situation where a transmission delay on a network line occurs.

In one aspect, the display quality of the animation may be Improved under the situation where the transmission delay on the network line occurs in the virtual desktop infrastructure.

Figure 1:
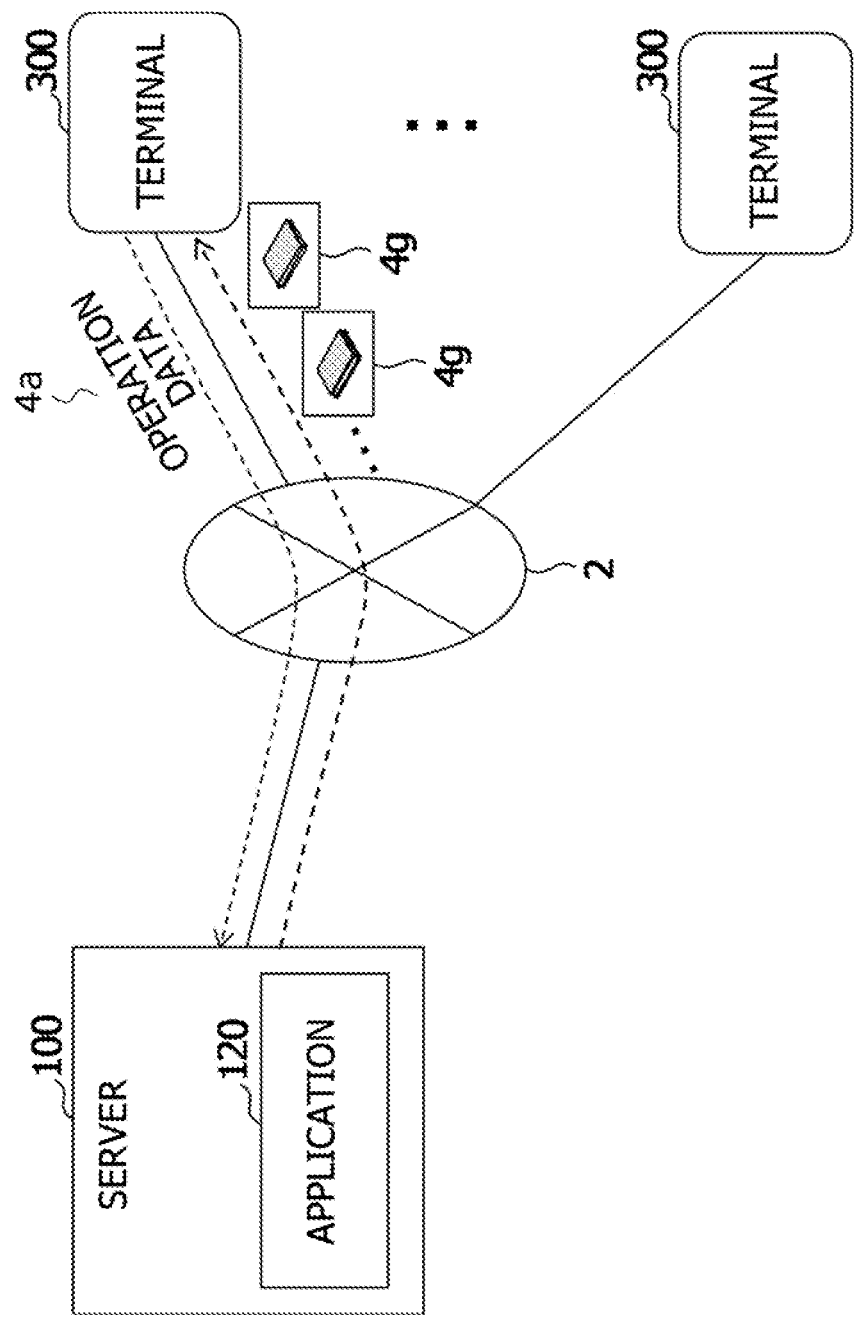
FIG. 1 is a diagram illustrating an example of a network configuration of a VDI system.

Hereinafter, an embodiment of the present disclosure is described with reference to the drawings. A system under a virtual desktop infrastructure (VDI) is configured, for example, as illustrated in FIG. 1. FIG. 1 is a diagram illustrating an example of a network configuration of the VDI system.

In FIG. 1, a VDI system 1000 includes a server 100 and one or more terminals 300, and each of terminals 300 is a virtual desktop that may be coupled to the server 100 via a network 2.

For displaying (reproducing) an animation through the network 2, there is streaming reproduction in which the server 100 provides animation content filmed and stored in advance and the animation content is reproduced on the terminal 300 in response to a request from the terminal 300. The terminal 300 accumulates frame data in the terminal 300 and waits for a reproducible state to display the animation.

There is live streaming reproduction in which the server 100 provides an animation in real time and the animation is reproduced on the terminal 300. Also in this case, the terminal 300 accumulates the frame data in the terminal 300 and waits for a reproducible state to display the animation.

Unlike the animation display described above, the VDI system 1000 in the present embodiment is targeting a system in which a user of the terminal 300 interactively operates, and in which a same response (low latency) as when using a normal personal computer terminal is demanded. Accordingly, the terminal 300 quickly displays the frame data in response to reception without accumulating the frame data. High-speed communication and a high-speed process are desired between the server 100 and the terminal 300.

In the VDI system 1000, when accepting a user operation, the terminal 300 transfers operation data 4a acquired by converting the operation to the server 100.

The server 100 reproduces the actual operation by the user in response to the operation data 4a and executes a process corresponding to the operation by an application 120, and then transmits an image 4g displayed on the screen of the server 100 to the terminal 300. The terminal 300 receives the image 4g from the server 100 and displays the image 4g. Images (frames) 4g are continuously displayed on the terminal 300 to reproduce the animation.

The VDI system 1000 described above is different from an ordinary computer operation in that the operation data 4a and the screen image 4g are transmitted and received through the network 2.

First, examples of hardware configurations of the server 100 and the terminal 300 will be described with reference to FIG. 2 and FIG. 3, and an example of a process sequence between the server 100 and the terminal 300 in the present embodiment will be described.

Figure 2:
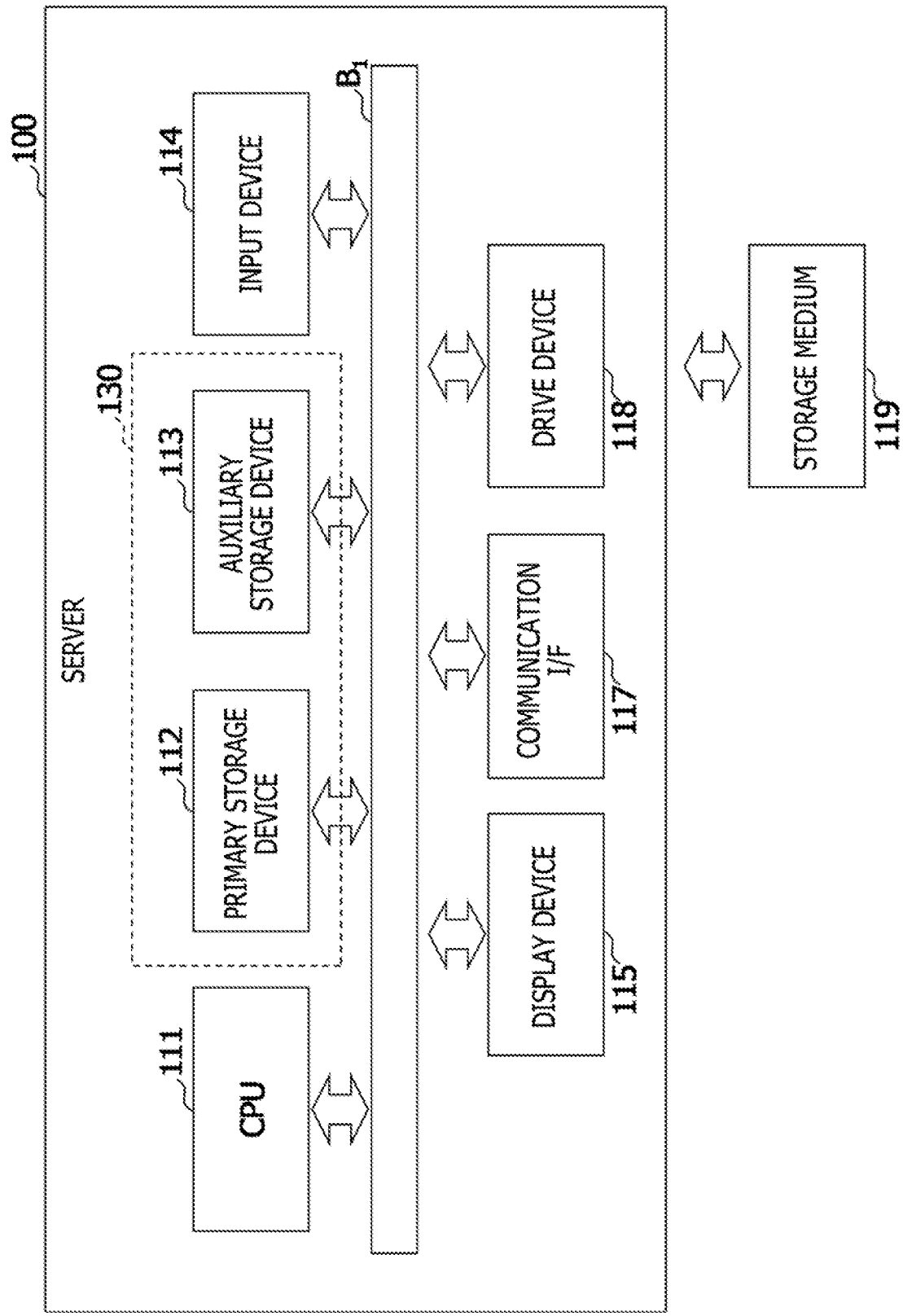
FIG. 2 is a diagram illustrating an example of a hardware configuration of a server.

FIG. 2 is a diagram illustrating the example of the hardware configuration of the server. In FIG. 2, the server 100 is an information process apparatus including a CPU 111, a primary storage device 112, an auxiliary storage device 113, an input device 114, a display device 115, a communication I/F 117, and a drive device 118, and is coupled to a bus B. A storage unit 130 includes the primary storage device 112, the auxiliary storage device 113, and the external storage device accessible by the server 100.

The CPU 111 corresponds to a processor that controls the server 100, and implements various processes according to the present embodiment described below by executing a program stored in the storage unit 130. The input device 114 is operated by a user and inputs data in response to the operation, and the display device 115 serves as a user interface to display various screens. The communication I/F 117 controls communication with an external device.

A program that implements a process on the server 100 side in the present embodiment stored in a storage medium 119 (for example, a compact disc read-only memory (CD-ROM) or the like) is installed in the storage unit 130 via the drive device 118 and may be executed by the CPU 111.

The storage medium 119 for storing the program on the server 100 side in the present embodiment is not limited to the CD-ROM, but may have computer-readable data structure and be one or more non-transitory and tangible media. As the computer-readable storage medium, in addition to the CD-ROM, a portable recording medium such as a digital versatile disk (DVD), a Universal Serial Bus (USB) memory, or the like, or a semiconductor memory such as a flash memory may be used.

Figure 3:
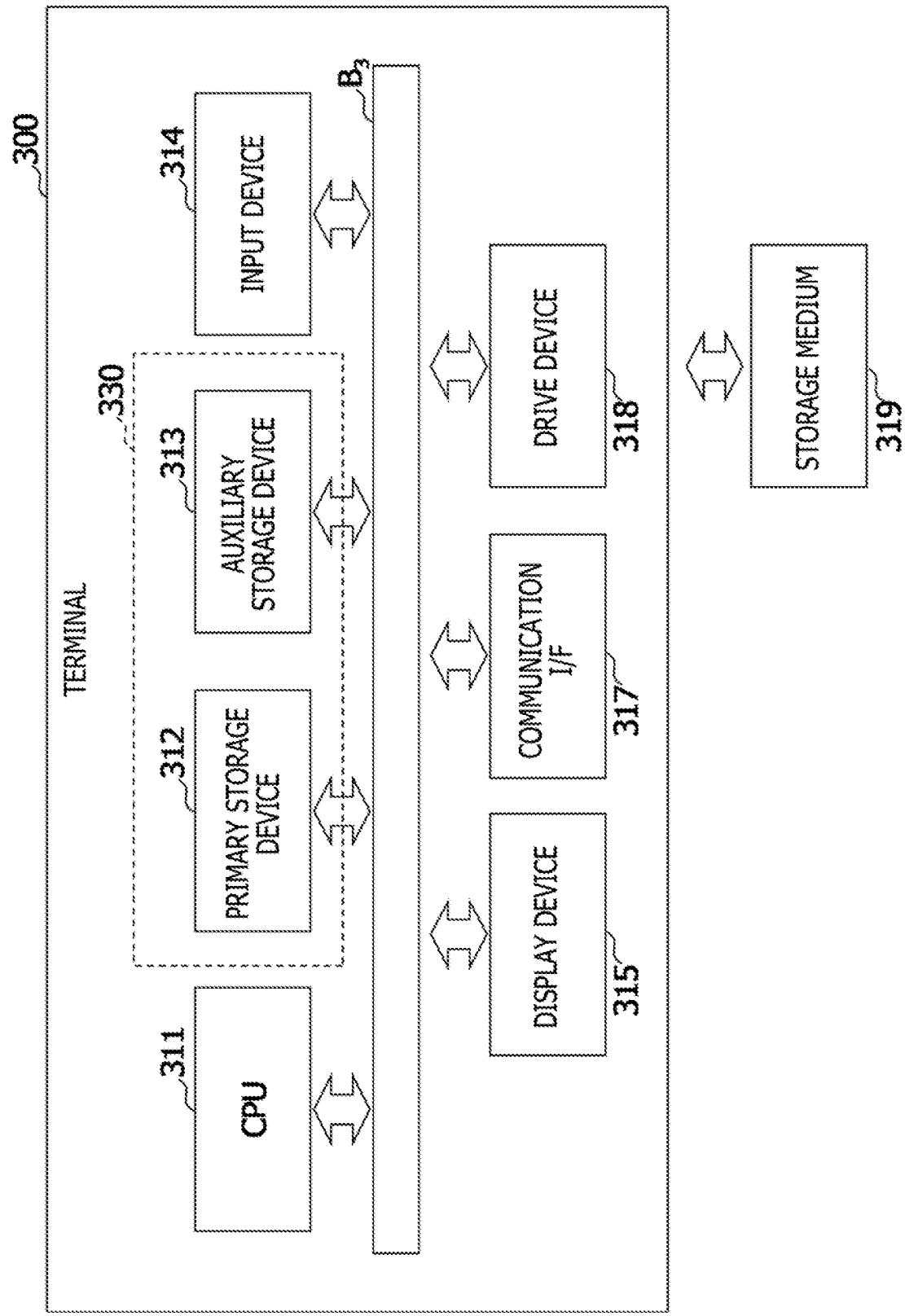
FIG. 3 is a diagram illustrating an example of a hardware configuration of a terminal.

FIG. 3 is a diagram illustrating the example of the hardware configuration of the terminal. In FIG. 3, the terminal 300 is an information process apparatus including a CPU 311, a primary storage device 312, an auxiliary storage device 313, an input device 314, a display device 315, a communication I/F 317, and a drive device 318, and is coupled to a bus $B_3$. A storage unit 330 includes the primary storage device 312, the auxiliary storage device 313, and the external storage device accessible by the terminal 300.

The CPU 311 corresponds to a processor that controls the terminal 300, and implements various processes according to the present embodiment described below by executing a program stored in the storage unit 330. The input device 314 is operated by a user and inputs data in response to the operation, and the display device 315 serves as a user interface to display various screens. The communication I/F 317 controls communication with an external device.

A received data display program according to the present embodiment stored in a storage medium 319 (for example, a compact disc read-only memory (CD-ROM) or the like) is installed in the storage unit 330 via the drive device 318 and may be executed by the CPU 311.

The storage medium 319 for storing the program according to the present embodiment is not limited to the CD-ROM, but may have computer-readable data structure and be one or more non-transitory and tangible media. As the computer-readable storage medium, in addition to the CD-ROM, a portable recording medium such as a digital versatile disk (DVD), a USB memory, or the like, or a semiconductor memory such as a flash memory may be used.

The terminal 300 may be a tablet terminal, and in this case, the input device 314 and the display device 315 are replaced by a touch panel in which they are integrated. A storage medium 319 is a secure digital (SD) memory card or the like, and the drive device 318 is an interface between the storage medium 319 set in the drive device 318 and the terminal 300.

Some VDI systems 1000 have an animation display function in some cases. As an example, when 3D-CG model data is displayed by the display or editing application 120, the 3D-CG model data is automatically rotated, or a display magnification and a display location of the 3D-CG model data are continuously changed as set in advance. The VDI system 1000 is used not only for office work but also for design work, design, and the like by using a computer-aided design (CAD).

An example of an interactive process involving an animation display performed in the VDI system 1000 will be described. In the following description, a case where the application 120 is a three-dimensional CAD that supports design of an electronic apparatus will be described, but is not limited to this example.

Figure 4:
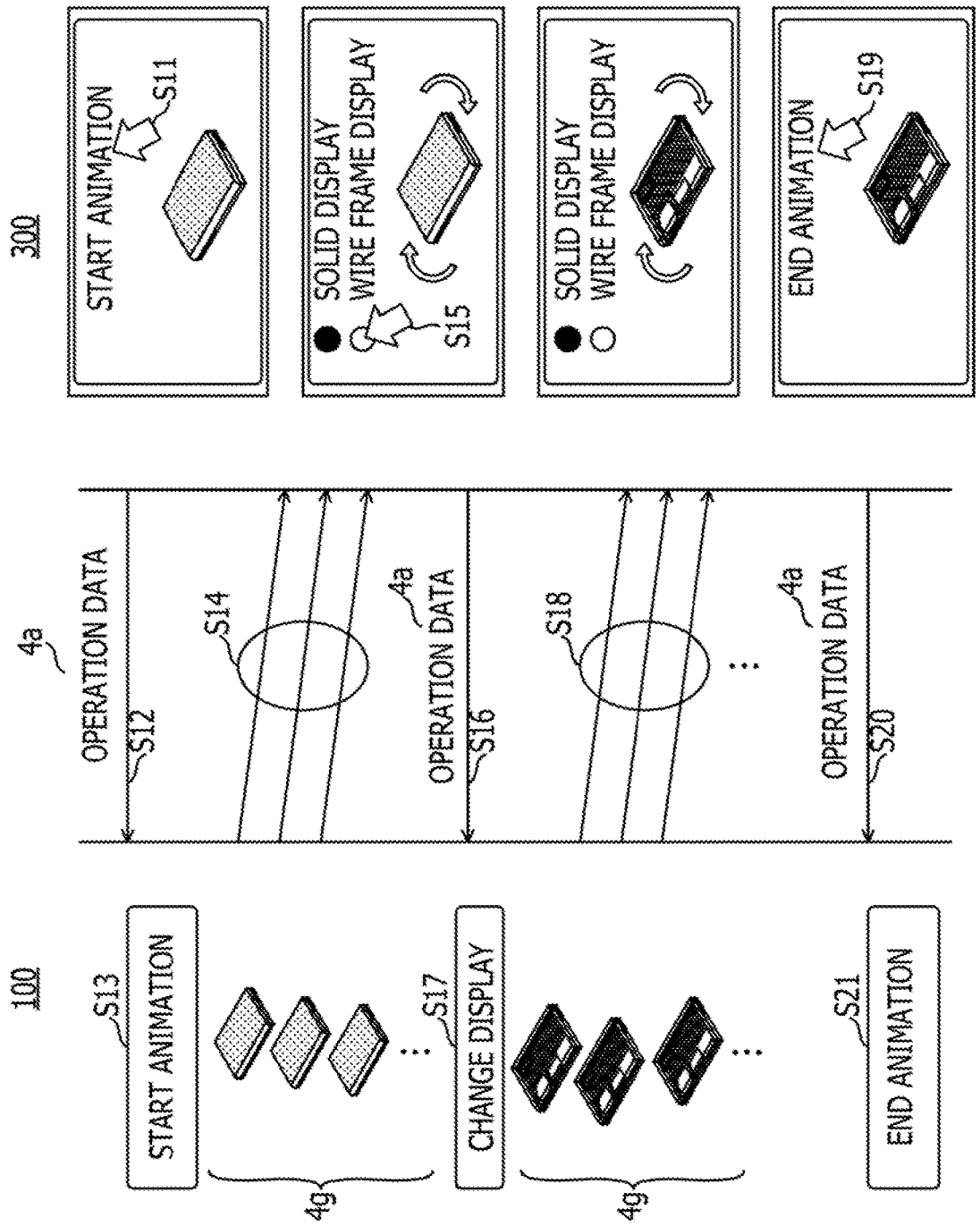
FIG. 4 is a diagram illustrating a process sequence in a VDI system.

FIG. 4 is a diagram illustrating the process sequence in the VDI system. In FIG. 4, when a user performs an operation of selecting "start animation" on the terminal 300 in a state where the terminal 300 is coupled to the server 100 (step S11), operation data 4a for instructing the animation display is transmitted to the server 100 (step S12).

In response to reception of the operation data 4a, in the server 100, the application 120 is instructed to display an animation, and an animation display on a screen is started (step S13). The images 4g on the screen displayed by the application 120 are sequentially transmitted to the terminal 300 (step 514). In this example, it is assumed that a solid display of the electronic apparatus is performed in three-dimension.

When the user confirms appearance of the electronic apparatus by the solid displays on the terminal 300 and then performs an operation of changing to a wire frame display (step S15), operation data 4a indicating the operation is transmitted to the server 100 (step S16).

In the server 100, in response to reception of the operation data 4a, the application 120 changes the display from the solid display to the wire frame display (step S17). The display method is changed, and images 4g displayed on the screen are sequentially transmitted to the terminal 300 (step S18). As a result, on the terminal 300, internal structure of the electronic apparatus is displayed in the three-dimensional wire frame display.

As described above, in response to the operation on the terminal 300, the processes of interactively changing the display in real time, distributing the images 4g, and the like are repeated.

Thereafter, when the user selects "end animation" (step S19), operation data 4a indicating the end of the animation is transmitted from the terminal 300 to the server 100 (step S20). In response to the operation data 4a, the application 120 ends the animation display in the server 100 (step S21).

Figure 5:
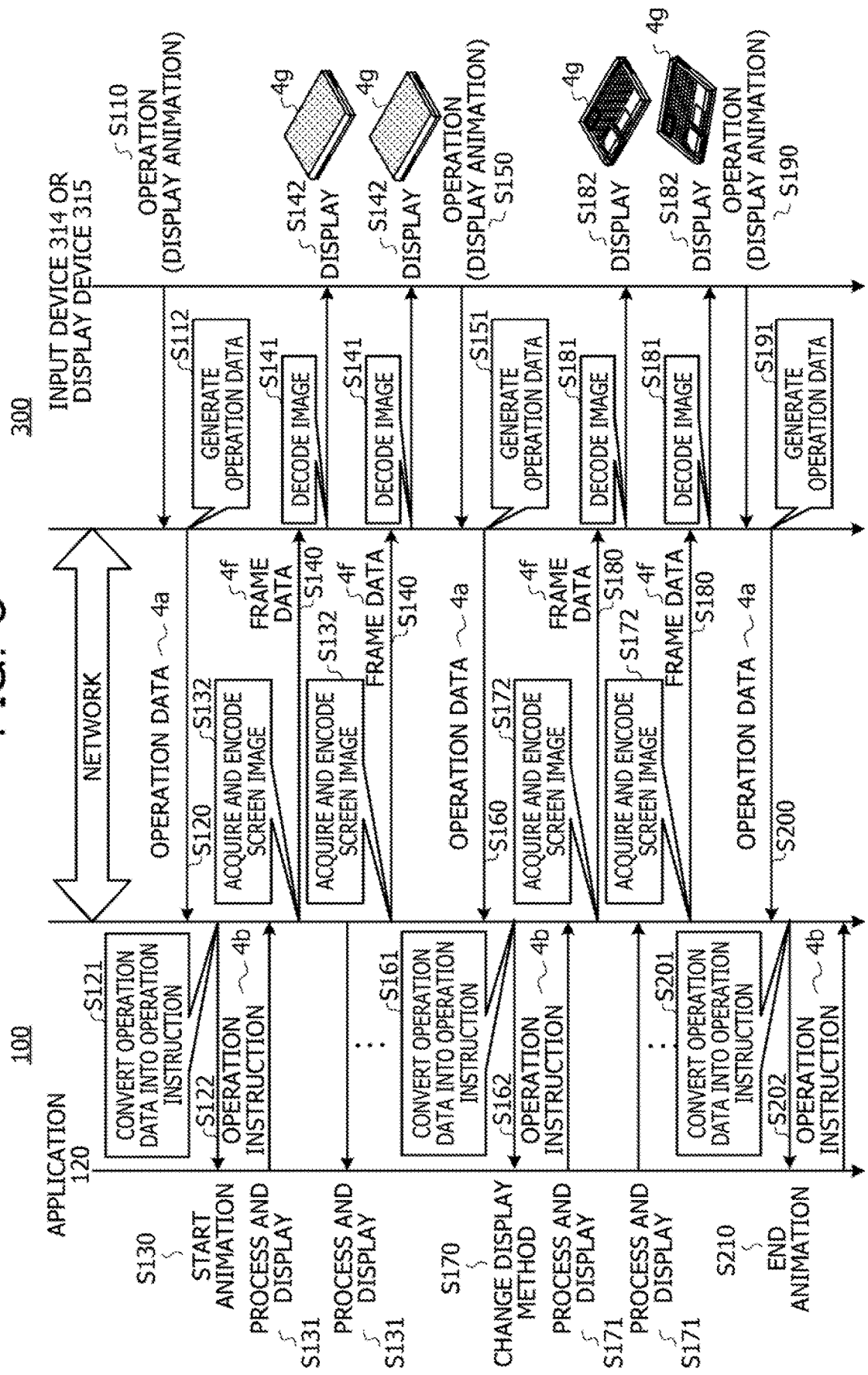
FIG. 5 is a diagram for explaining process timings of a server and a terminal in the process sequence illustrated in FIG. 4.

FIG. 5 is a diagram for explaining process timings of the server and the terminal in the process sequence illustrated in FIG. 4. In FIG. 5, when the user operates the input device 314 to select an animation display on the terminal 300 (step S110), the terminal 300 generates operation data 4a indicating an operation (step S112), and transmits the operation data 4a to the server 100 (step S120).

The server 100 converts the operation data 4a into an operation instruction 4b (step S121), and notifies the application 120 of the operation instruction 4b (step S122). In response to the notification of the operation instruction 4b, the application 120 starts an animation (step S130).

The application 120 performs an animation process and display in the server 100 (step S131). The server 100 acquires and encodes a screen image 4g displayed as the animation to generate frame data 4f (step S132). The generated frame data 4f is transmitted to the terminal 300 (step S140), the image 4g is decoded from the frame data 4f in the terminal 300 (step S141), and the image 4g is displayed on the display device 315 (step S142).

By repeating steps S131 to S142, the images 4g are continuously displayed on the terminal 300, whereby the animation display is performed on the display device 315.

When the user operates the terminal 300 to change a display method by using the input device 314 (step S150), the terminal 300 generates operation data 4a (step S151), and transmits the operation data 4a to the server 100 (step S160).

The server 100 converts the operation data 4a into an operation instruction 4b (step S161), and notifies the application 120 of the operation instruction 4b (step S162). In response to the notification of the operation instruction 4b, the application 120 performs changing to the display method designated by the operation instruction 4b (step S170).

The application 120 performs an animation process and display in the changed display method (step S171). The server 100 acquires and encodes a screen image 4g displayed as an animation to generate frame data 4f (step S172). The generated frame data 4f is transmitted to the terminal 300 (step S180), the image 4g is decoded from the frame data 4f in the terminal 300 (step S181), and the image 4g is displayed on the display device 315 (step S182).

By repeating steps S171 to S182, the images 4g are continuously displayed on the terminal 300, whereby the animation display is performed on the display device 315 using the changed display method.

Thereafter, when the user operates the input device 314 to select the end of animation on the terminal 300 (step S190), the terminal 300 generates operation data 4a indicating an operation (step S191), and transmits the operation data 4a to the server 100 (step S200).

The server 100 converts the operation data 4a into an operation instruction 4b (step S201), and notifies the application 120 of the operation instruction 4b (step S202). In response to the notification of the operation instruction 4b, the application 120 ends the animation (step S210).

In the VDI system 1000, the server 100 changes an animation corresponding to the operation in real time in response to a user operation performed during an animation operation on the terminal 300. The terminal 300 does not receive and accumulate all frame data 4f of an animation by a certain display method in the storage unit 330 in advance, but outputs to the display device 315 in response to reception of new frame data 4f.

Before an image 4g displayed on the server 100 is displayed on the terminal 300, at least a process time in the server 100 (hereinafter referred to as "server process time"), a network transmission time, a process time in the terminal 300 (hereinafter referred to as "terminal process time"), and the like are demanded. These process times change with time, and fluctuation in the process times may affect display quality of an animation on the terminal 300.

Figure 6:
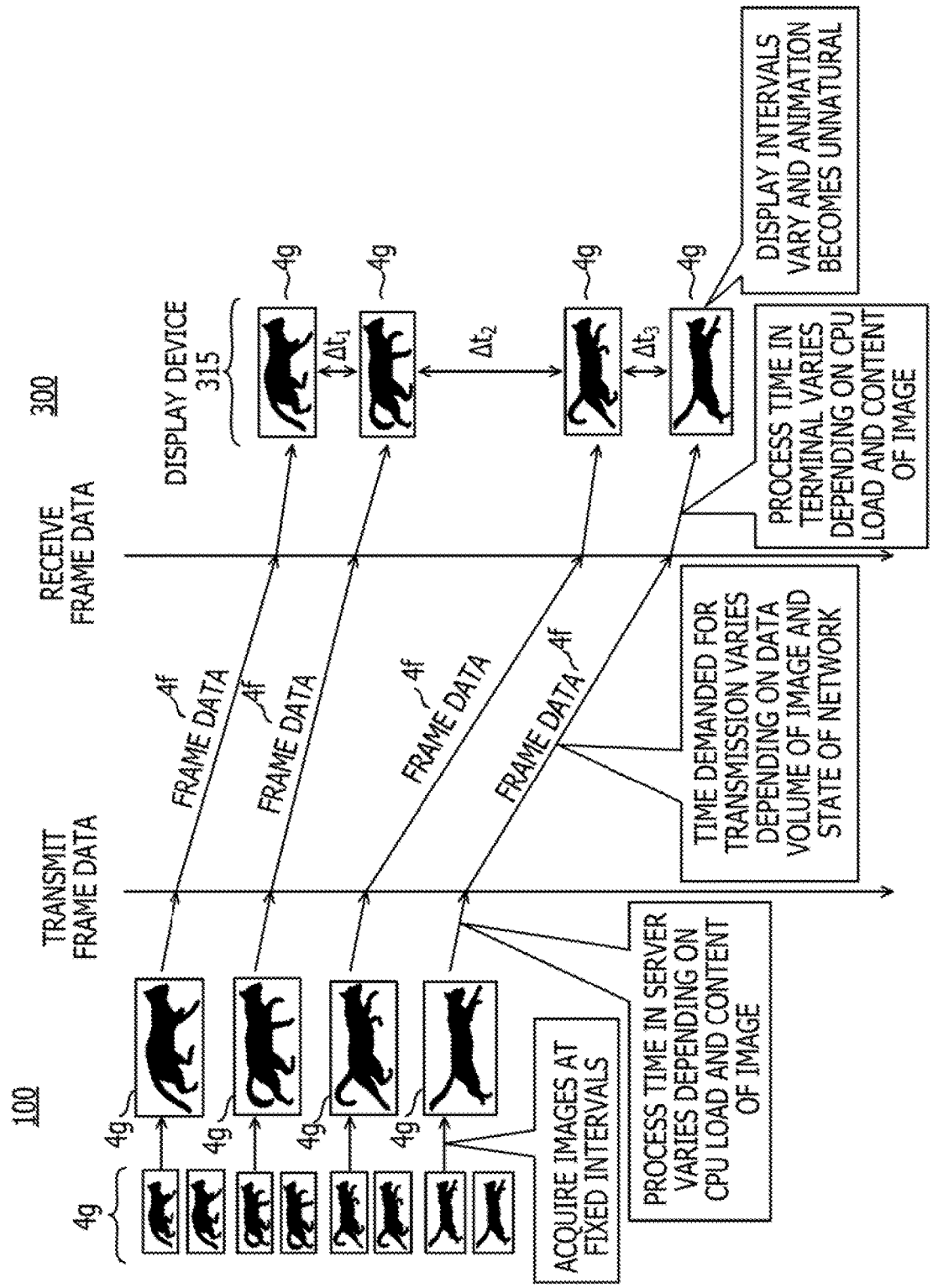
FIG. 6 is a diagram for explaining deterioration in display quality of an animation.

FIG. 6 is a diagram for explaining deterioration in display quality of an animation. In FIG. 6, the server 100 acquires images 4g from the images 4g displayed by the application 120 at fixed intervals, and generates and transmits frame data 4f. A time demanded for generating the frame data 4f varies depending on a CPU load, content of the image 4g, and the like. In transmission of the frame data 4f, a time demanded for transmission varies depending on data volume of the image 4g and a state of the network 2.

On the other hand, in the terminal 300, each time the frame data 4f is received, the image 4g is decoded from the received frame data 4f and displayed on the display device 315. Reception intervals of pieces of the frame data 4f are not uniform due to the process time in the server 100 and the network transmission time. The process time in the terminal 300 varies depending on a CPU load, content of the image, and the like.

Due to accumulation of the various process time changes as described above, display intervals $\Delta t_1$, $\Delta t_2$, and $\Delta t_3$ between the images 4g vary, and animation motion on the terminal 300 seen by a user becomes unnatural. Using the example in FIG. 6, an example of a total process time for each of the four images 4g displayed on the display device 315 will be described with reference to FIG. 7.

Figure 7:
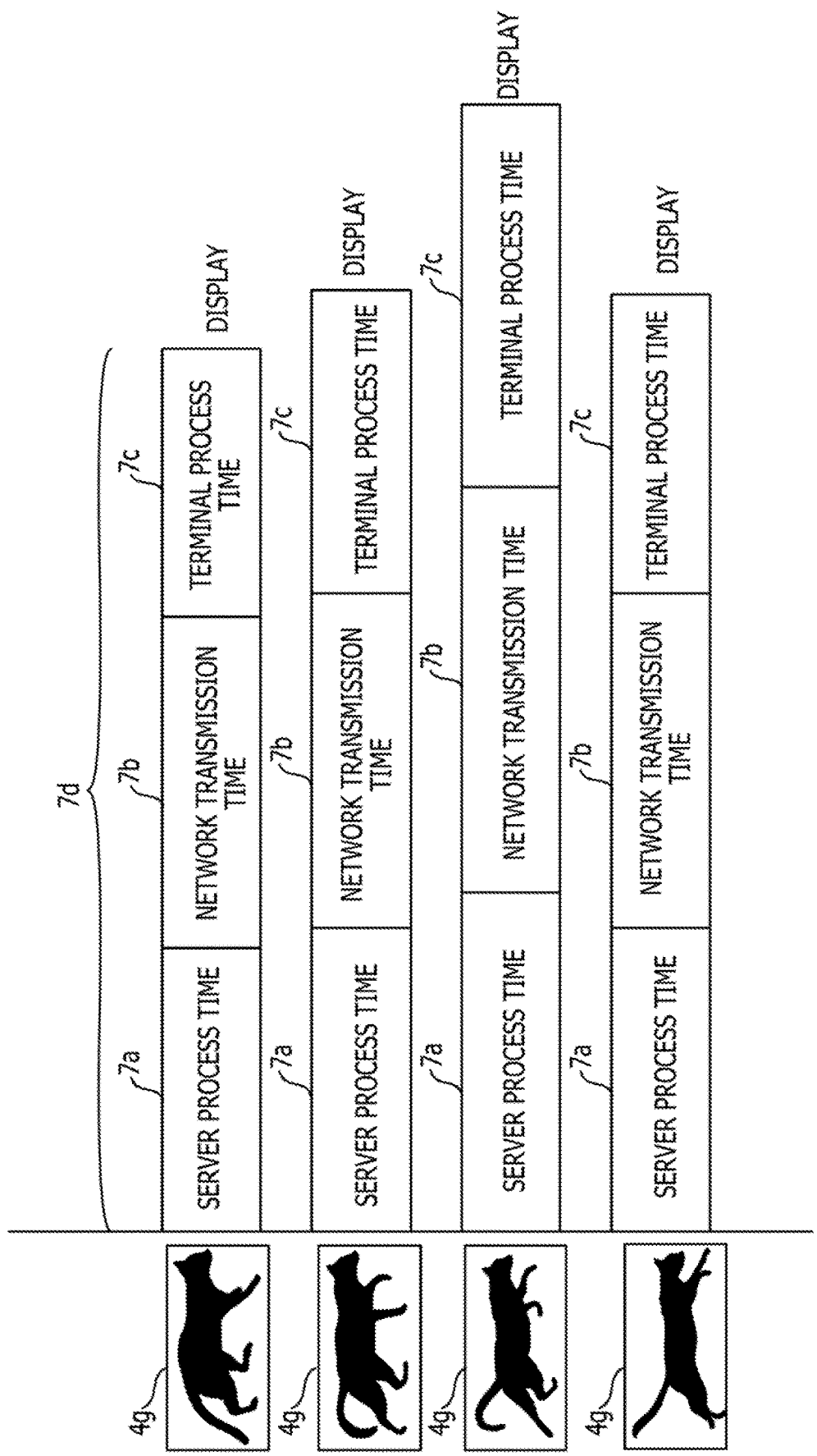
FIG. 7 is a diagram illustrating an example of a total process time until an image is displayed on a terminal.

FIG. 7 is a diagram illustrating the example of the total process time until the image is displayed on the terminal. FIG. 7 illustrates a total process time 7d acquired by accumulating a server process time 7a, a network transmission time 7b, and a terminal process time 7c for each of the four images 4g.

The total process time 7d becomes longer in the order of a first image 4g, a second image 4g, and a third image 4g, and a fourth image 4g returns to approximately the same state as the second image 4g. When the total process times differ from each other and are not uniform, unnaturalness occurs in the animation.

When 3D-CG model data is displayed by the animation using the application 120, the total process times 7d differ from each other in part or whole of the images 4g displayed on the terminal 300.

This is because in the VDI system 1000, when the frame data 4f is transmitted by using the network 2 between the server 100 and the terminal 300, a time when the frame data 4f reaches the terminal 300 varies depending on the usage status of the network 2. Times demanded for encoding in the server 100 and for decoding the image 4g in the terminal 300 are very short but vary depending on the content of the image 4g.

Thus, each interval between the images is different between the server 100 and the terminal 300, and when the 3D animation is displayed on the server 100, on the terminal 300, the animation based on the images 4g does not change smoothly causing non-uniform changes, so that the human eyes may feel unsmooth motion, or may receive an unnatural impression due to the uneven motion.

The inventors have paid attention to a fact that by displaying these successive images 4g at appropriate intervals, it is possible for human (user's) eyes to recognize that motion of the animation is smoothly changing, and have found a method of adjusting a display timing of the images 4g on the terminal 300.

Figure 8:
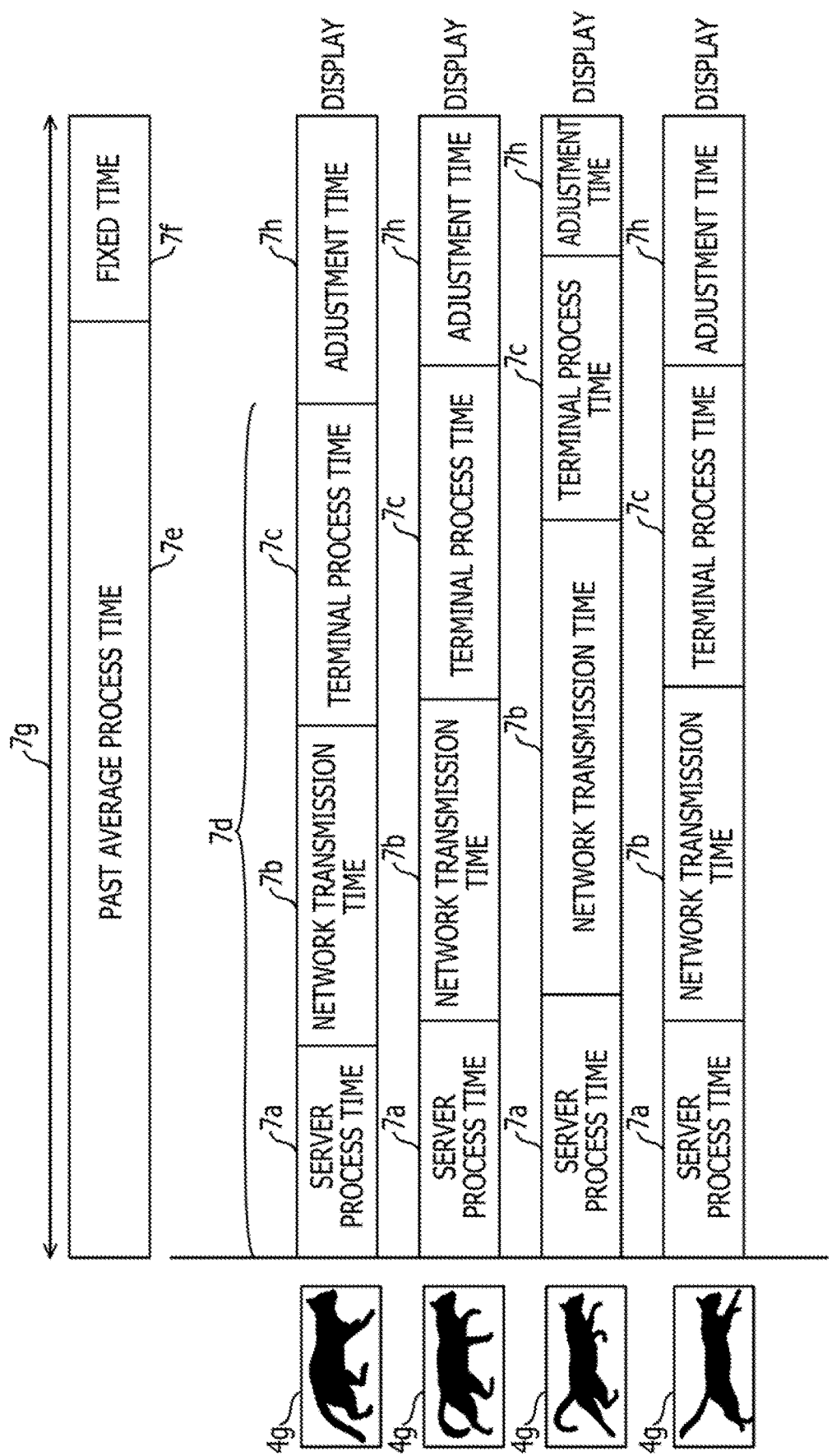
FIG. 8 is a diagram for explaining a method of displaying successive images at an appropriate interval.

FIG. 8 is a diagram for explaining a method of displaying successive images at appropriate intervals. As illustrated in FIG. 8, the terminal 300 determines a time acquired by adding a predetermined fixed time 7f to an average process time 7e acquired by averaging the past total process times 7d as a target process time 7g. With the target process time 7g, the successive images 4g are displayed at a fixed interval 7f.

In the present embodiment, an adjustment time 7h to be added to the total process time 7d is determined so as to satisfy the target process time 7g, thereby determining a display time point. Thus, each of the images 4g is displayed at approximately the same time interval $\Delta T$, and it is possible to make the user not to feel unnatural changes when watching the animation.

Figure 9:
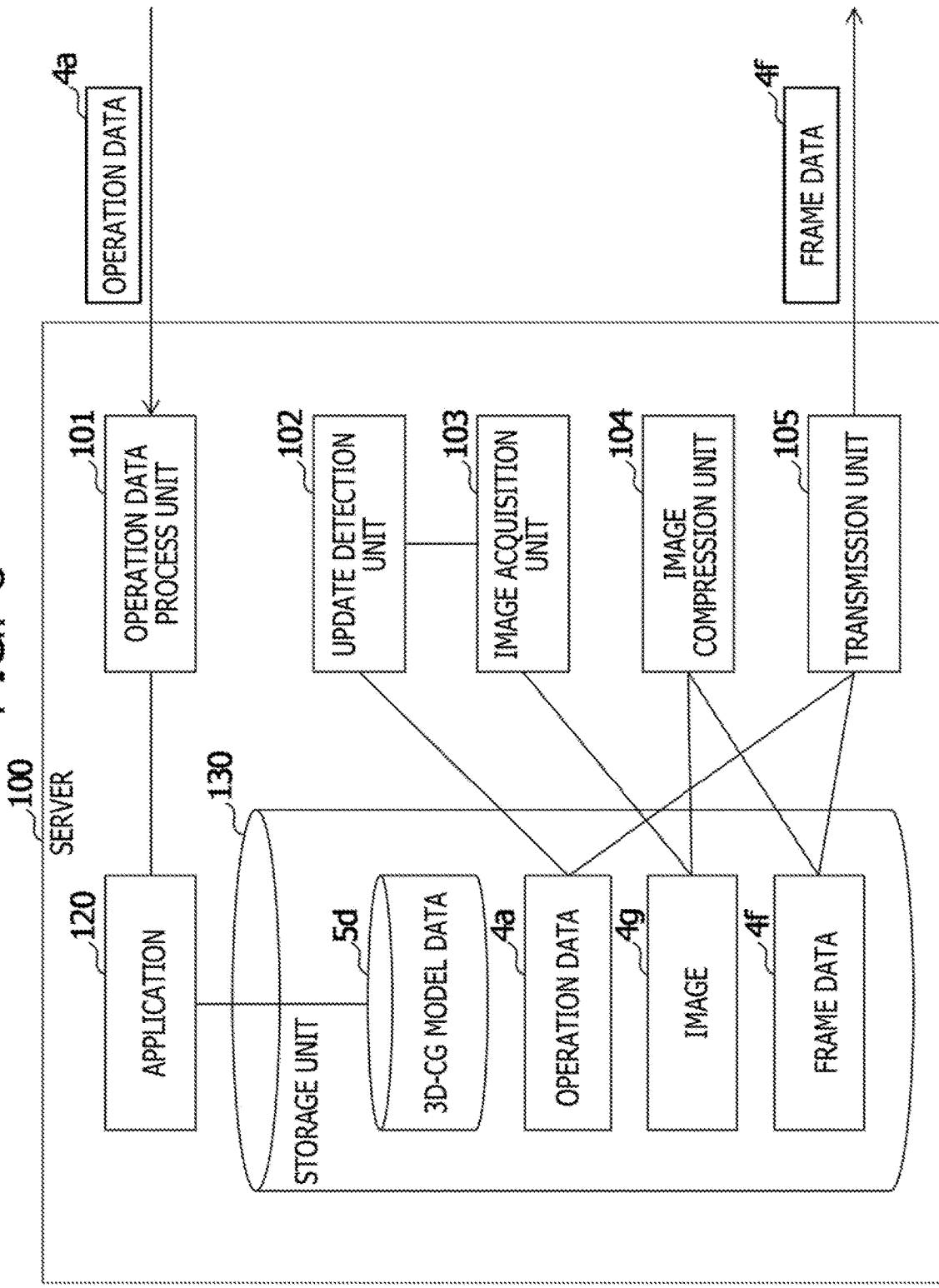
FIG. 9 is a diagram illustrating a functional configuration example of a server.

Next, functional configuration examples of the server 100 and the terminal 300 will be described. FIG. 9 is a diagram illustrating the functional configuration example of the server. In FIG. 9, the server 100 includes an operation data process unit 101, a detection unit 102, an image acquisition unit 103, an image compression unit 104, a transmission unit 105, and the application 120. The operation data process unit 101, the detection unit 102, the image acquisition unit 103, the image compression unit 104, the transmission unit 105, and the application 120 are implemented by a process that the received data display program installed on the server 100 causes the CPU 111 of the server 100 to execute. The storage unit 130 stores 3D-CG model data 5d, images 4g, frame data 4f, and the like.

When the operation data process unit 101 receives operation data 4a transmitted from the terminal 300 by the communication I/F 317, the operation data process unit 101 operates the application 120 so that a user operates the server 100 in response to the operation data 4a.

The detection unit 102 monitors an update of display content of a screen displayed on the display device 115 by an operation of the application 120, and notifies the image acquisition unit 103 when detecting that the display content is updated. The detection unit 102 stores a screen update detection time point 8c (FIG. 11) indicating a time point at which the update is detected in the storage unit 130.

The image acquisition unit 103 acquires an image 4g on the displayed screen in response to the notification from the detection unit 102, and stores the acquired image 4g in the storage unit 130.

The image compression unit 104 acquires image data 4g-2 (FIG. 11) by encoding and compressing the image 4g acquired by the image acquisition unit 103, and sets the screen update detection time point 8c stored in the storage unit 130 in the frame data 4f including the acquired image data 4g-2. The generated frame data 4f is stored in the storage unit 130. The transmission unit 105 transmits the frame data 4f stored in the storage unit 130 to the terminal 300.

The application 120 is an application that displays a 3D-CG model in a three dimensional space and displays an animation. Examples of the 3D-CG model include products such as cars and electronic apparatuses, living things, fluids, and the like. The application 120 switches the animation display in real time in response to the user operation, and performs a process interactively with the user.

In the present embodiment, the application 120 switches a process in response to the operation data 4a, and changes content to be displayed according to a process result. In the operation data 4a, user operations performed on the terminal 300 such as a start of an animation, an end of an animation, a change of a display method, zoom-in, zoom-out, rotation, and the like are instructed.

Figure 10:
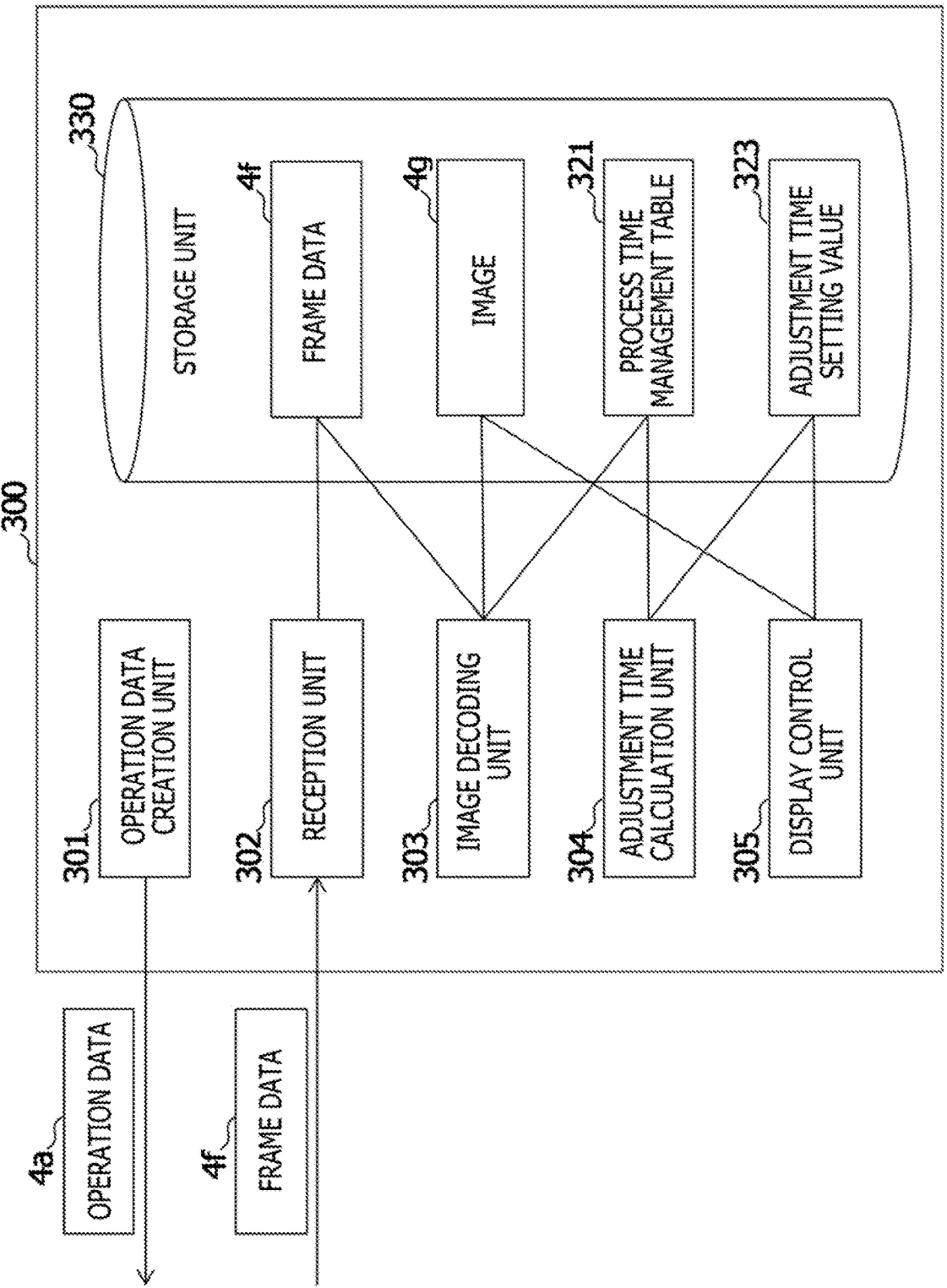
FIG. 10 is a diagram illustrating a functional configuration example of a terminal.

FIG. 10 is a diagram illustrating the functional configuration example of the terminal. As illustrated in FIG. 10, the terminal 300 includes an operation data creation unit 301, a reception unit 302, an image decoding unit 303, an adjustment time calculation unit 304, and a display control unit 305. The operation data creation unit 301, the reception unit 302, the image decoding unit 303, the adjustment time calculation unit 304, and the display control unit 305 are implemented by a process executed by the CPU 311 of the terminal 300 by the program installed in the terminal 300. The storage unit 330 stores frame data 4f, images 4g, a process time management table 321, an adjustment time setting value 323, and the like.

The operation data creation unit 301 creates operation data indicating the content of operation performed by a user to the terminal 300 by using the input device 314, and transmits the operation data to the server 100 from the communication I/F 317.

The reception unit 302 receives the frame data 4f transmitted from the server 100 by the communication I/F 317, and stores the frame data 4f in the storage unit 330.

Figure 13:
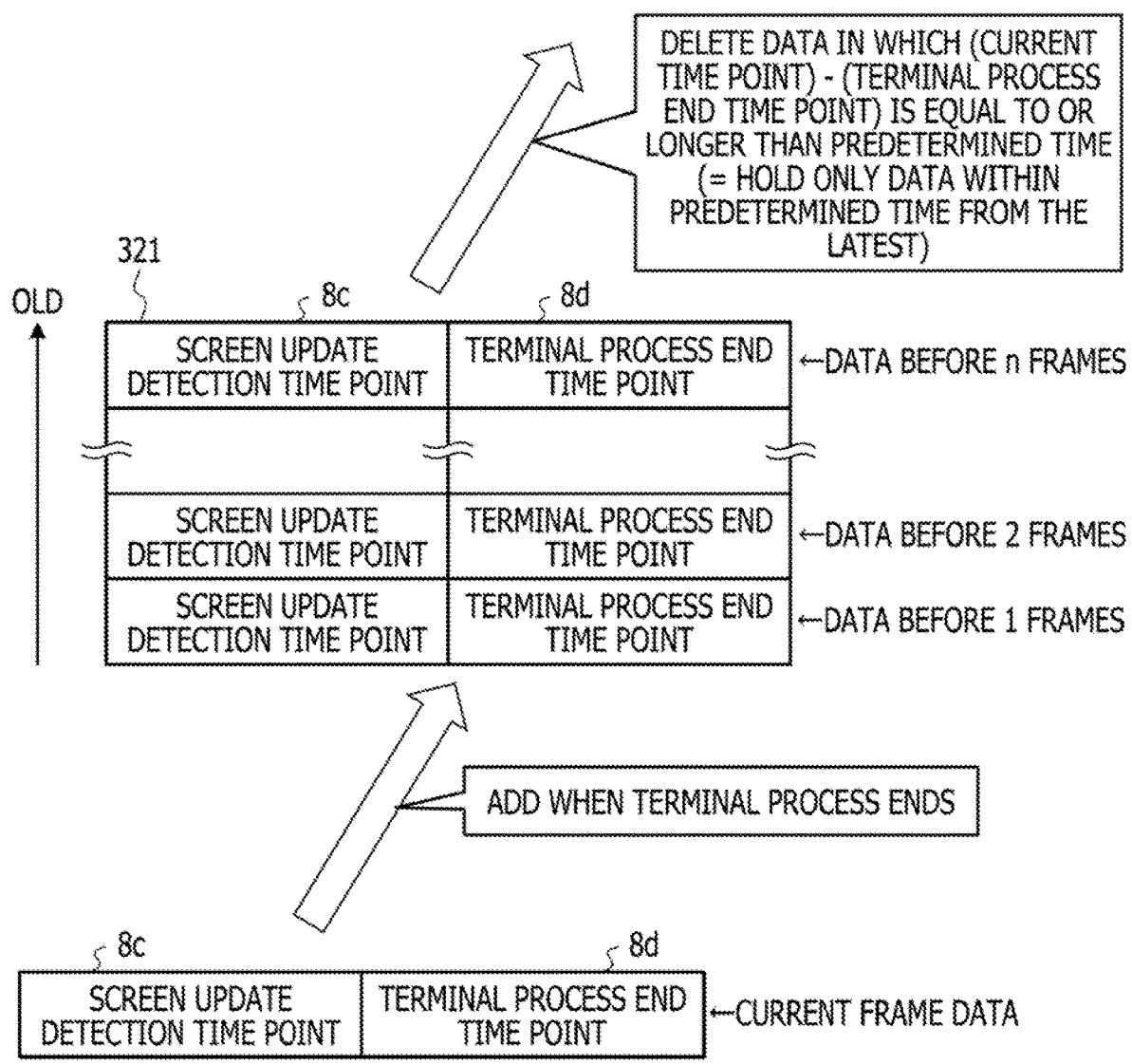
FIG. 13 is a diagram illustrating an example of data structure and an example of a table management method of a process time management table.

The image decoding unit 303 decodes the image 4g from the frame data 4f stored in the storage unit 130, and stores the acquired image 4g in the storage unit 330. The image decoding unit 303 acquires a screen update detection time point 8c from the frame data 4f (FIG. 11), and acquires a current time point as a terminal process end time point 8d (FIG. 13). The image decoding unit 303 accumulates data indicating the acquired screen update detection time point 8c and terminal process end time point 8d in the process time management table 321.

The adjustment time calculation unit 304 calculates a past average process time 7e by using the process time management table 321, adds a fixed time 7f to the average process time 7e to acquire a target process time 7g, and acquires an adjustment time 7h from the acquired target process time 7g and the total process time 7d of the image 4g being processed. The acquired adjustment time 7h is stored in the storage unit 330 as the adjustment time setting value 323.

The past average process time 7e is acquired for the data having the terminal process end time point 8d included in the latest fixed period managed in the process time management table 321. At this time, when there is data older than the latest fixed period, the adjustment time calculation unit 304 preferably manages data deletion.

The display control unit 305 acquires the adjustment time 7h from the adjustment time setting value 323, and when the adjustment time 7h has elapsed from the current time point, acquires the image 4g from the storage unit 330 and displays the image 4g on the display device 315.

Figure 11:
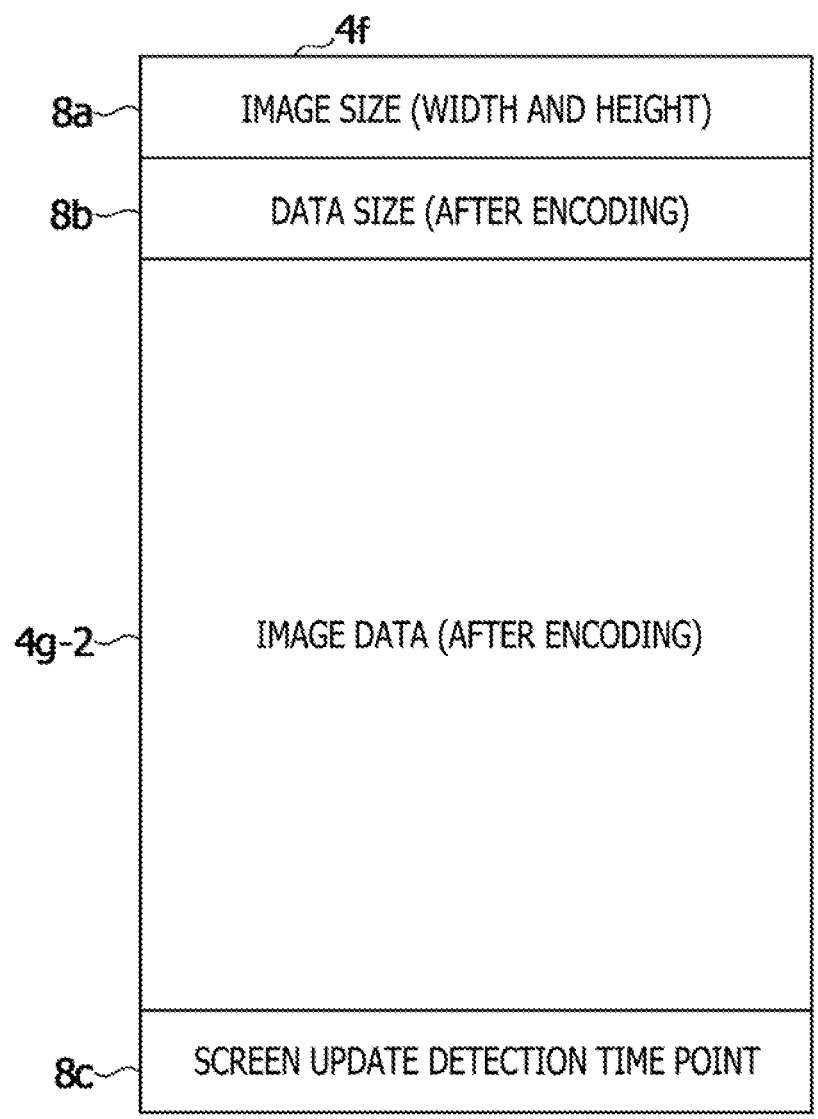
FIG. 11 is a diagram illustrating an example of data structure of frame data.

FIG. 11 is a diagram illustrating an example of data structure of frame data. As illustrated in FIG. 11, the frame data 4f includes image size 8a, data size 8b, image data 4g-2, the screen update detection time point 8c, and the like.

The image size 8a indicates a width and a height of an image 4g. As an example, the width and the height are designated by the number of pixels. The data size 8b indicates a data length of the image data 4g-2 acquired by encoding the image 4g. As an example, the data size 8b is indicated by the number of bytes. The image data 4g-2 is data acquired by encoding the image 4g. The screen update detection time point 8c is a time point set by the server 100, and indicates a time point when the detection unit 102 detects an update of display content.

Figure 12:
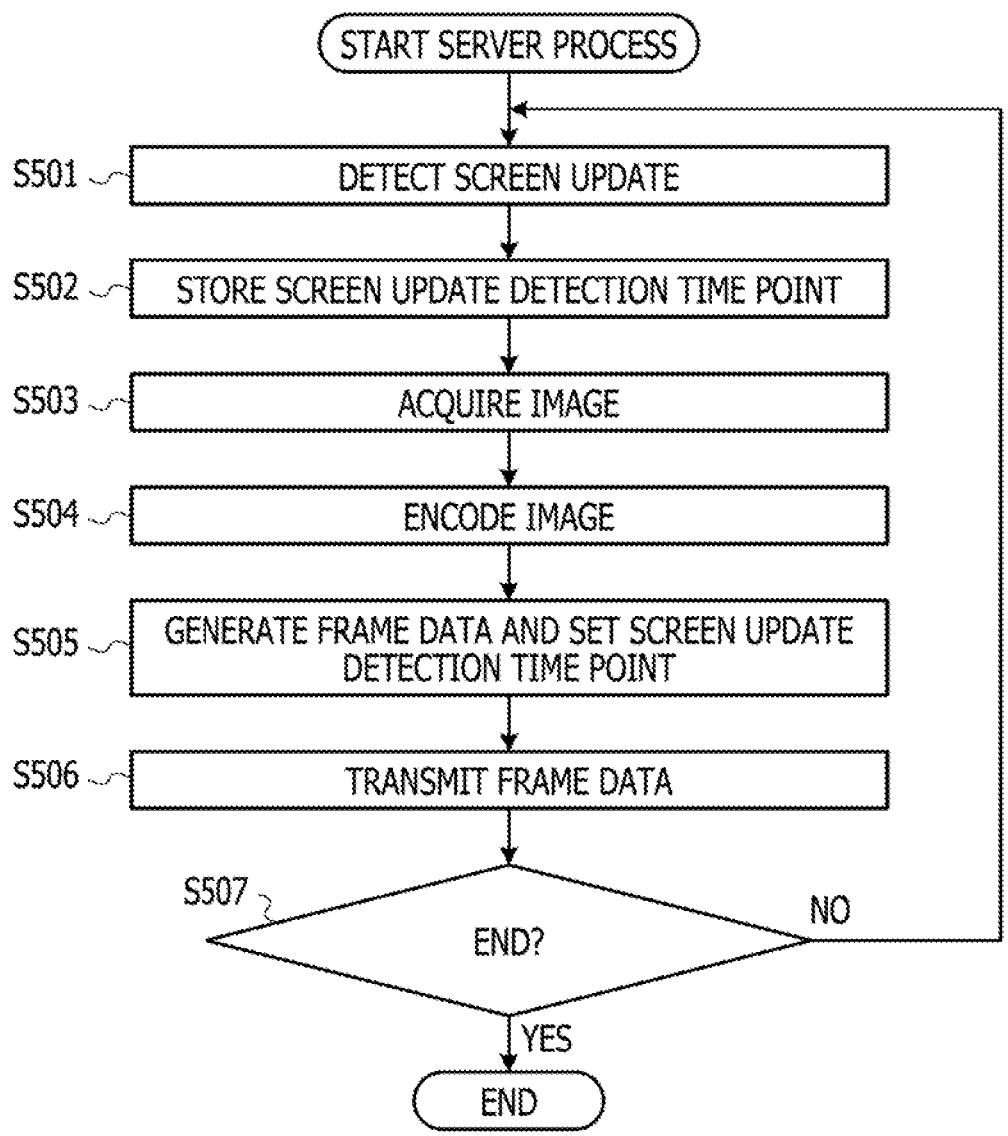
FIG. 12 is a flowchart for explaining a server process performed in a server.

FIG. 12 is a flowchart for explaining a server process performed by the server. As illustrated in FIG. 12, when the detection unit 102 detects a screen update (step S501), the server 100 stores a screen update detection time point 8c in the storage unit 130 (step S502), and notifies the image acquisition unit 103 of the screen update.

When receiving the screen update notification, the image acquisition unit 103 acquires an image 4g on the screen displayed by the application 120 (step S503). The acquired image 4g is stored in the storage unit 130. The image acquisition unit 103 notifies the image compression unit 104 of the acquisition of the image 4g.

The image compression unit 104 encodes the image 4g to acquire image data 4g-2 (step S504). The image compression unit 104 generates frame data 4f including the acquired image data 4g-2 in the storage unit 130, and sets a screen update detection time point 8c in the frame data 4f (step S505). When the frame data 4f is created, image size 8a and data size 8b are also set in the frame data 4f. The transmission unit 105 is notified of completion of generation of the frame data 4f.

When receiving the notification of the completion of the generation of the frame data 4f, the transmission unit 105 transmits the frame data 4f to the terminal 300 (Step S506). After the transmission of the frame data 4f is completed, it is determined whether or not the application 120 is ended (step S507). When the end is notified by operation data 4a transmitted from the terminal 300, the application 120 ends. In this case (YES in step S507), the server process to the terminal 300 ends. On the other hand, when the process is not completed (NO in step S507), the process returns to step S501 and the same processes as described above are repeated.

Next, the process time management table 321 used in the terminal process performed by the terminal 300 will be described, and the terminal process will be described in detail.

FIG. 13 is a diagram illustrating an example of data structure and an example of a table management method of the process time management table. As illustrated in FIG. 13, the process time management table 321 is a table for storing and managing pieces of frame data in time series, and stores a screen update detection time point 8c, a terminal process end time point 8d, and the like for each frame (each received frame data 4f).

When an image 4g is decoded from image data 4g-2 included in the frame data 4f received by the image decoding unit 303, current frame data is added to the process time management table 321 as the latest data. The frame data for each image 4g indicates the screen update time point 8c acquired from the frame data 4f and the terminal process end time point 8d acquired when the image 4g is acquired.

Among the pieces of data managed in the process time management table 321, data in which a time length acquired by subtracting the terminal process end time point from a current time point is equal to or longer than a predetermined time is deleted. By holding only pieces of data within a predetermined time from the latest, it is possible to suppress an area in the process time management table 321 from being wastefully consumed for managing the process time.

Figure 14:
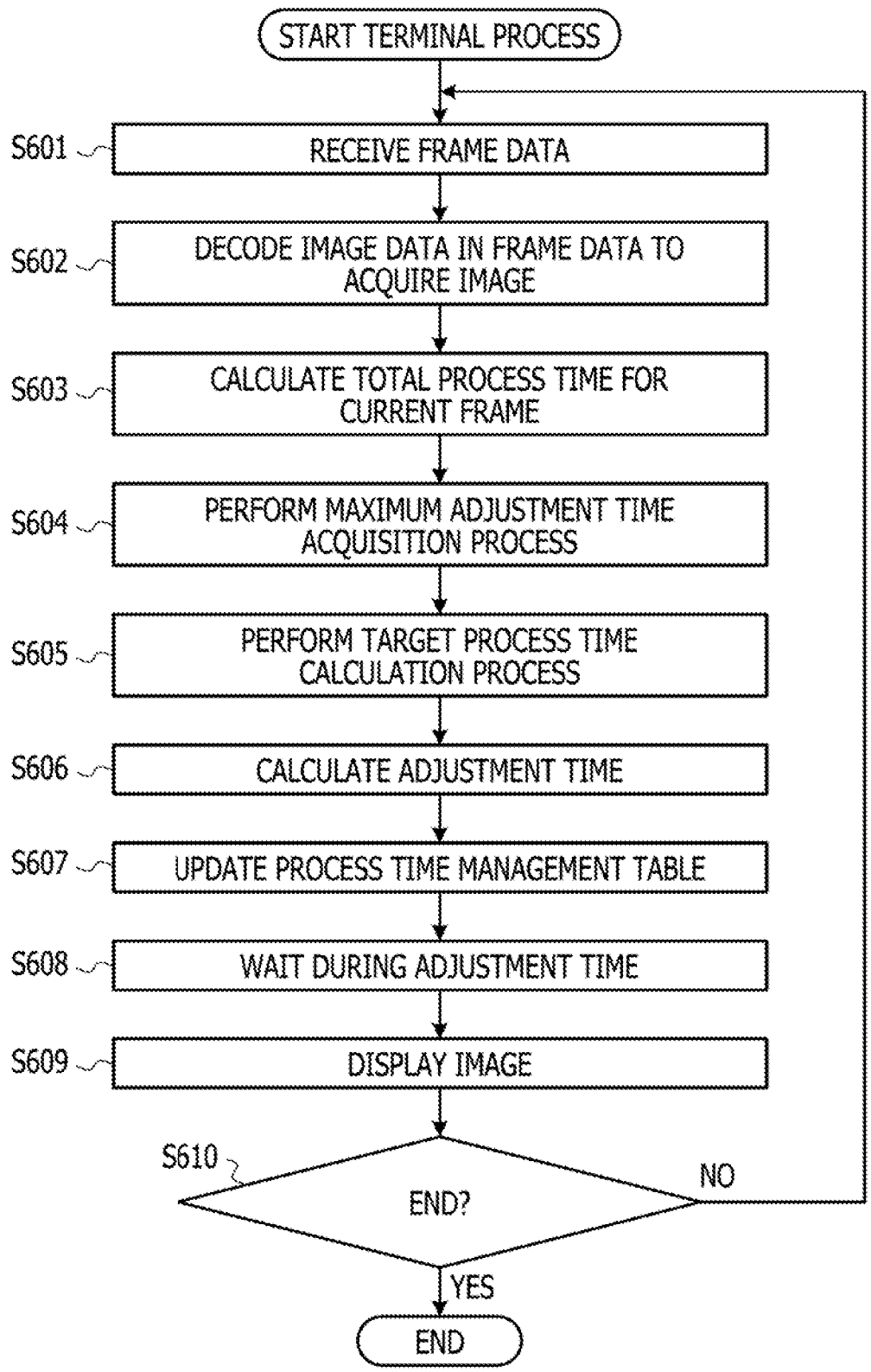
FIG. 14 is a flowchart for explaining a terminal process performed in a terminal.

FIG. 14 is a flowchart for explaining the terminal process performed by the terminal. As illustrated in FIG. 14, in the terminal 300, the reception unit 302 receives frame data 4f, and the storage unit 130 stores the frame data 4f (step S601). The image decoding unit 303 is notified that the frame data 4f is received. In response to the notification of the reception of the frame data 4f, the image decoding unit 303 decodes an image 4g from image data 4g-2 in the frame data 4f (step S602). Completion of decoding is notified to the adjustment time calculation unit 304.

In response to the decoding completion notification, the adjustment time calculation unit 304 performs steps S603 to S607 (adjustment time calculation process). The adjustment time calculation unit 304 calculates a total process time 7d for a current frame (step S603). The total process time 7d is acquired by the total process time for the current frame=end time point of the terminal process (current time point)—screen update detection time point (Formula 1).

The adjustment time calculation unit 304 acquires the current time point, and acquires the screen update detection time 8c from the frame data 4f. The adjustment time calculation unit 304 acquires the total process time 7d for the current frame by subtracting the screen update detection time point 8c from the current time point. The acquired total process time 7d corresponds to the sum of the server process time 7a, the network transmission time 7b, and the terminal process time 7c, as described with reference to FIG. 7 and FIG. 8.

Subsequently, the adjustment time calculation unit 304 performs a maximum adjustment time acquisition process (step S604) (FIG. 15), and performs a target process time calculation process (step S605) (FIG. 17). The adjustment time calculation unit 304 calculates an adjustment time 7h for the image 4g from the total process time 7d acquired in step S603 and the target process time 7g acquired in step S605 (step S606). An adjustment time setting value 323 indicating the calculated adjustment time 7h is stored in the storage unit 330.

The adjustment time calculation unit 304 updates the process time management table 321 (step S607). Since the update of the process time management table 321 is as described with reference to FIG. 13, a detailed description thereof will be omitted.

When the adjustment time 7h indicated by the adjustment time setting value 323 has elapsed, the display control unit 305 displays the image 4g stored in the storage unit 330 on the display device 315 (step S609). Thereafter, it is determined whether the terminal process is ended or not (step S610). When the latest operation by a user is an end (YES in step S610), the terminal process ends. On the other hand, when the operation is not ended (NO in step S610), the terminal process returns to step S601, and the same processes as described above are repeated.

In the flowchart described above, step S603 may be performed after step S604 and step S605. Step S607 may be performed after step S605 and before step S610 which is a determination process.

Figure 15:
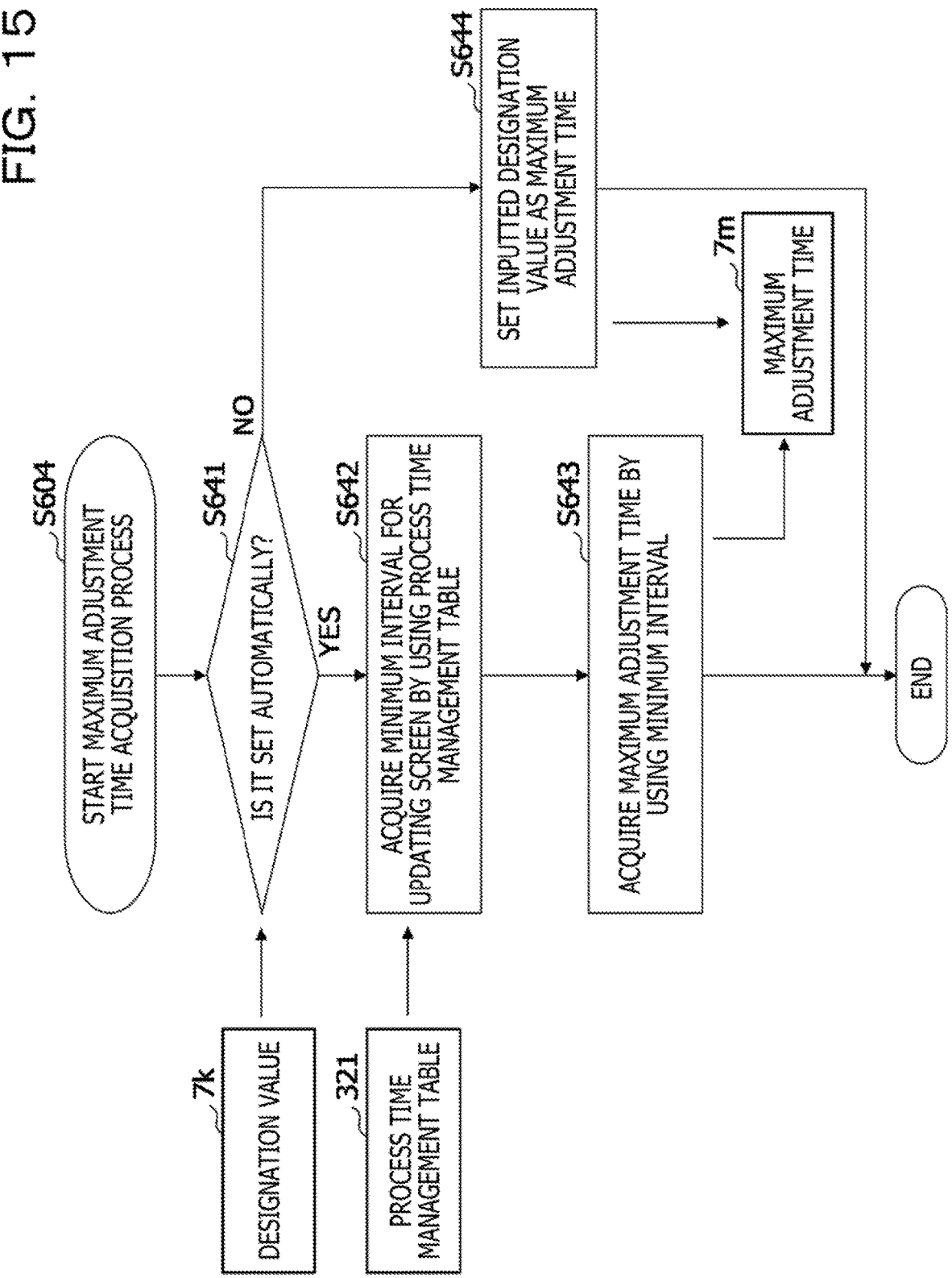
FIG. 15 is a flowchart for explaining a maximum adjustment time acquisition process in step S604 in FIG. 14.

FIG. 15 is a flowchart for explaining the maximum adjustment time acquisition process in step S604 in FIG. 14. In FIG. 15, it is assumed that a setting screen G90 as illustrated in FIG. 16 that allows a user operation to select whether or not the application 120 of the server 100 automatically set a maximum adjustment time 7m is displayed. And it is assumed that a value selectively set by the user is stored in the storage unit 330. The details of the setting screen G90 will be described later.

As illustrated in FIG. 15, the adjustment time calculation unit 304 determines whether or not the maximum adjustment time 7m is set automatically (step S641). The adjustment time calculation unit 304 refers to a designation value 7k stored in the storage unit 330 to determine whether or not the maximum adjustment time 7m is set automatically. As an example, an indication (flag) indicating whether or not the setting is automatic and a value are set in the designation value 7k. When the automatic setting is selected (flag indicates 1), the value indicates a coefficient for acquiring the maximum adjustment time 7m. When the automatic setting is not selected (flag indicates 0), the value indicates the maximum adjustment time 7m itself.

When it is determined that the setting is automatic (YES in step S641), the adjustment time calculation unit 304 acquires a minimum interval for updating a screen by using the process time management table 321 (step S642). A difference between screen update detection time points 8c of two consecutive frames is acquired by sequentially shifting the screen update detection time points 8c in the process time management table 321 one by one, and a minimum interval among the acquired differences is selected.

Next, the adjustment time calculation unit 304 acquires the maximum adjustment time 7m by multiplying the minimum interval acquired in step S642 by the coefficient indicated by the designation value 7k, outputs the maximum adjustment time 7m to the storage unit 330 (step S643), and ends the maximum adjustment time acquisition process.

On the other hand, when it is determined that the setting is not automatic (NO in step S641), the adjustment time calculation unit 304 outputs the designation value 7k to the storage unit 330 as the maximum adjustment time 7m (step S644), and ends the maximum adjustment time acquisition process.

FIG. 16 is a diagram illustrating an example of a setting screen for the maximum adjustment time. The setting screen G90 illustrated in FIG. 16 includes an input area 90a and an input area 90b.

The input area 90a is an area for specifying the coefficient for automatically calculating the maximum adjustment time 7m. As an example of specifying the coefficient, a range of 0.8 to 1.2 is preferable. The input area 90b is an area for specifying the maximum adjustment time 7m by a user.

By inputting to either the input area 90a or the input area 90b on the setting screen G90, the storage unit 330 stores the designation value 7k indicating whether or not the setting is automatic and the value. When the application 120 is being used, the user may display the setting screen G90 at any timing.

FIG. 17 is a flowchart for explaining the target process time calculation process in step S605 in FIG. 14. In FIG. 17, the adjustment time calculation unit 304 calculates a total process time 7d for each frame by referring to the process time management table 321 (step S651). The total process time 7d is acquired by the total process time=terminal process end time point−screen update detection time point (Formula 2).

The adjustment time calculation unit 304 averages the acquired total process times 7d to calculate an average process time 7e (step S652). The adjustment time calculation unit 304 determines a fixed time 7f based on a maximum adjustment time 7m stored in the storage unit 330 (step S653).

The fixed time 7f may be defined by multiplying the maximum adjustment time 7m by 1/n times. n is a natural number of 2 or more, and may be changed by a user. As a default value, n=2 may be used.

Next, the adjustment time calculation unit 304 adds the fixed time 7f to the average process time 7e to acquire a target process time 7g, stores the acquired target process time 7g in the storage unit 330 (step S654), and ends the target process time calculation process.

When the acquired target process time 7g is short, a time difference between the server 100 and the terminal 300 becomes small, but an effect by time adjustment in the present embodiment is small in a situation where a display interval is long. On the other hand, when the target process time 7g is long, the time difference between the server 100 and the terminal 300 becomes large, and the effect of the time adjustment in the present embodiment is large in a situation where the display interval is long.

The present disclosure is not limited to the specifically disclosed embodiment, and various modifications and variations are possible without departing from the scope of the claims.

In the embodiment described above, encoding is an example of compression, and decoding is an example of decompression. The total process time 7d of the image 4g being processed in the terminal 300 is an example of a current process time. The adjustment time calculation unit 304 is an example of an adjustment time acquisition unit, and the step S607 in FIG. 14 is an example of an update unit.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process for displaying received data, the process comprising:

acquiring a display target time by adding a fixed time to an average process time, which is an average of a sum of past times demanded for compression, network transfer, and decompression;

acquiring a second time point when a decompression process of a data body is completed after reception of data which includes a first time point before a server compresses the data body;

acquiring a current process time which indicates a sum of times demanded for compression, network transfer, and decompression of the data body by subtracting the first time point from the second time point;

acquiring an adjustment time by subtracting the current process time from the display target time;

displaying the data body by delaying the adjustment time; and updating a past average process time by including the current process time.

2. The non-transitory computer-readable recording medium according to claim 1, the process further comprising:

acquiring a minimum interval between the first time points among pieces of received data; and by using the minimum interval, calculating the fixed time which includes a variation from the average process time.

3. The non-transitory computer-readable recording medium according to claim 2, the process further comprising:

acquiring the fixed time by dividing a value acquired by multiplying the minimum interval by a given coefficient, by a given natural number.

4. The non-transitory computer-readable recording medium according to claim 1, wherein the data body is image data acquired by encoding a screen image displayed on the server.

5. The non-transitory computer-readable recording medium according to claim 1, the process further comprising:

displaying an animation with pieces of data successively; and when an operation to the computer is accepted while the animation is displaying, interactively receiving and displaying animation data with a changed display method from the server by creating operation data which indicates the operation and transmitting the created operation data to the server.

6. The non-transitory computer-readable recording medium according to claim 1, wherein the computer is a virtual desktop.

7. A received data display method comprising:

acquiring, by a computer, a display target time by adding a fixed time to an average process time, which is an average of a sum of past times demanded for compression, network transfer, and decompression;

acquiring a second time point when a decompression process of a data body is completed after reception of data which includes a first time point before a server compresses the data body;

acquiring a current process time which indicates a sum of times demanded for compression, network transfer, and decompression of the data body by subtracting the first time point from the second time point;

acquiring an adjustment time by subtracting the current process time from the display target time;

displaying the data body by delaying the adjustment time; and updating a past average process time by including the current process time.

8. An electronic apparatus comprising:

a memory; and a processor coupled to the memory and configured to:

acquire a display target time by adding a fixed time to an average process time, which is an average of a sum of past times demanded for compression, network transfer, and decompression;

acquire a second time point when a decompression process of a data body is completed after reception of data which includes a first time point before a server compresses the data body;

acquire a current process time which indicates a sum of times demanded for compression, network transfer, and decompression of the data body by subtracting the first time point from the second time point; and acquire an adjustment time by subtracting the current process time from the display target time;

display the data body by delaying the adjustment time; and update a past average process time by including the current process time.

* * * * *